3,019,384
MOISTURE INDICATING DEVICE
Harry A. Wayne, 4120 W. Greenwood, Skokie, Ill.
Filed Oct. 20, 1958, Ser. No. 768,111
9 Claims. (Cl. 324—29)

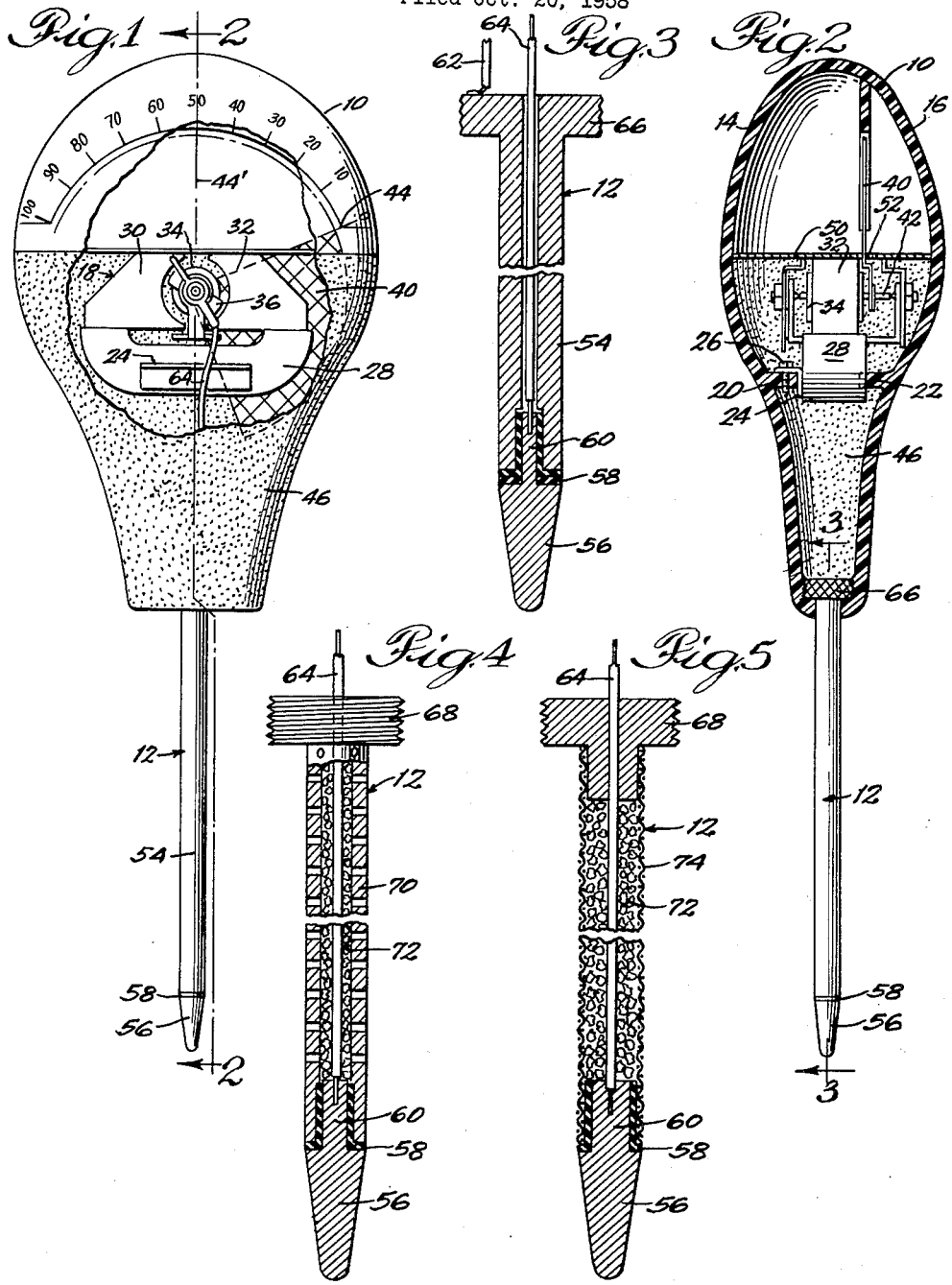

This invention relates generally to sensing and indicating devices, and more particularly to a new and improved moisture indicator of rugged and relatively inexpensive construction.

The problem of measuring the moisture content or resistivity of a given substance or material exists in many different areas. One such area, for example, is in the field of landscaping and gardening where it often is difficult to determine when the soil requires water, and when sufficient water has been sprinkled on the soil to maintain a vigorous and healthy growth.

Devices are known in the prior art which are directed to this problem, but generally these devices are either complex, or costly, or fragile, or required a separate power source, or combine two or more of these undesirable characteristics.

Accordingly, it is an object of this invention to provide a new and improved device for indicating moisture which overcomes the difficulties of the prior art.

It is a further object of this invention to provide a new and improved moisture indicator of rugged and compact construction.

It is a still further object of this invention to provide a new and improved moisture indicator, as described above, which may be completely self-contained, requiring no separate element or power source for its operation.

It is another object of this invention to provide a new and improved indicator which may advantageously be used to sense and indicate the resistivity of a substance or material.

It is still another object of this invention to provide a new and improved indicating device, as described above, which is characterized by its economy of construction and operation.

These and other objects are realized in accordance with one illustrative embodiment of the invention which comprises a hollow housing, at least a portion of which is transparent, and an elongated probe extending from the housing. Within the housing there is positioned an electric motor, which advantageously may comprise a permanent magnet stator and a rotatable armature having a pair of terminals connected thereto. In accordance with a feature of this invention an indicating device, such as a brightly colored flag, is attached to the armature so as to be rotatable therewith.

Advantageously, the probe extending from the housing may take the form of a hollow metallic tube electrode terminating in a metallic tip electrode with suitable insulating means provided at the junction of the tube and tip to prevent direct electrical contact therebetween. An electrical conductor connects the probe tip with one terminal of the motor armature and another conductor connects the tube of the probe to the other terminal of the motor armature.

In accordance with the features of one embodiment of the invention, the probe tube and tip electrodes are formed of dissimilar metals, as for example, brass and zinc, to the end that an electric current is generated whenever the junction of the tube and tip is bridged by a suitable electrolyte. Thus, if the probe is inserted in the soil, the motor will be energized to rotate the indicating flag only when sufficient moisture exists at the electrode junction level of the soil. In gardening, for example, the flag at its rest position would indicate that sprinkling is desired and the rotated flag would indicate that no more sprinkling is required. The control of lawn sprinkling thus provided is of great advantage, and particularly in those communities where the cost and availability of water during the hot season are ever-increasing problems.

Another illustrative embodiment of the invention comprises a probe which may readily be attached to and detached from the housing to the end that one housing may be used with several probes. A still further illustrative embodiment of the invention comprises a probe with a porous tube portion having a suitable depolarizer therein for minimizing polarization of the probe.

The above and other features of novelty which characterize this invention are pointed out with particularity in the claims annexed to and forming a part of this specification. For a better understanding of this invention, however, its advantages and its specific objects attained with its use, reference is had to the accompanying drawings and descriptive matter in which are shown and described several illustrative embodiments of the invention.

In the drawings:

FIGURE 1 is a front elevational view, partly broken, of one illustrative embodiment of the invention;

FIGURE 2 is a side elevational view, partly in cross-section, taken substantially as shown along line 2—2 of FIGURE 1;

FIGURE 3 is a cross-sectional view of one embodiment of sensing probe in accordance with the invention, taken substantially as shown along line 3—3 of FIGURE 2;

FIGURE 4 is a cross-sectional view of another embodiment of sensing probe in accordance with the invention; and FIGURE 5 is a cross-sectional view of a still further embodiment of sensing probe in accordance with the invention.

Although the invention is disclosed herein as particularly useful for indicating the moisture content of lawns and the like to aid the use of sprinklers and other watering devices, it will be apparent to those skilled in the art that this particular use is merely illustrative of the principles of the invention, and that the invention may be used with equally advantageous results to sense and indicate moisture content or material resistivity in a number of other applications.

There is shown in the drawing, and more particularly in FIGURES 1 and 2 thereof, a specific illustrative embodiment of the invention which finds particularly advantageous use in indicating the moisture content of the soil in lawns and the like. In accordance with a feature of this invention, this illustrative embodiment comprises a hollow housing 10 having an elongated probe 12 extending therefrom. Advantageously, hollow housing 10 may take the form of a molded plastic body which is assembled by cementing the two symmetrical molded plastic sections 14 and 16 together to form an enclosed unitized structure.

In another illustrative embodiment the hollow housing 10 may take the form of a molded plastic body which is assembled by cementing a top transparent cup-shaped member to an opaque hollow base member. The hollow housing 10 preferably is formed of any suitable high impact plastic material such as for example, polystyrene or cellulose acetate.

An electric motor 18 is positioned within hollow housing 10 and advantageously, the two symmetrical sections 14 and 16 of the housing 10 may be each provided with an inwardly extending web, such as web 20 of section 14 and web 22 of section 16, which are adapted to support the electric motor 18 in position within the housing. In accordance with one embodiment of the invention, the electric motor may be supported on one side thereof by means of a bracket 24 which is secured to web 20 by means of a screw 24, and the motor is supported at the other side thereof by the web 22 which is wedged thereagainst. Thus, in the assembly of the invention, the electric motor 18 first may be secured in position on the web 20, and then section 16 of the housing is cemented to section 14 such that the web 22 serves to locate and wedge the motor firmly into position.

As shown in FIGURES 1 and 2, the electric motor 18 is of standard construction and comprises a stator including permanent magnet 28 having the pole pieces 30 and 32 suitably connected to opposite poles of the magnet 28, and a rotatable armature 34 adapted to rotate within the gap defined by pole pieces 30 and 32 when energizing current is supplied to the winding 36 of the armature.

In accordance with a feature of this invention, an indicating flag 40, which advantageously may be formed of lightweight sheet material such as metal foil, is secured to the motor armature shaft 42 so as to rotate with the armature when the later is energized. The flag 40 is shown as defining a quadrant sector of a circle but those skilled in the art will appreciate that the flag may take any desired form or shape. As shown in the illustrative embodiment of FIGURE 1, when electric motor 18 is unenergized, the flag 40 rests substantially in the lower half of the housing 10 with only the leading edge 44 thereof showing above the motor 18. When the motor 18 is energized, and the armature 34 is rotated, the flag 40 is similarly rotated into the upper half of the housing 10 with the leading edge as shown at 44'. However, those skilled in the art will readily appreciate that the invention may be constructed with the indicating flag 40 in its upright viewable position when motor 18 is not energized such that energization of motor 18 causes flag 40 to be rotated within the opaque portion of housing 10. Thus either the presence or the absence of flag 40 in the transparent portion of housing 10 may be utilized as the indicating position of the flag.

To facilitate the indicating function of the invention, the lower portion of the hollow housing 10 may be made opaque by the application thereto of a suitable opaque material such as the coating 46 shown on the inner surface of the housing in FIGURES 1 and 2. Advantageously, the upper portion of housing 10 is transparent and thus, when the flag 40 is in its rest position only a small portion thereof may be seen above the opaque portion of the housing, while all or substantially all of the flag may be seen when the flag 40 is raised by the energization of motor 18 to its indicating position. This indicating function may be further facilitated, in accordance with an aspect of this invention, by coloring the flag in a desired manner and by the use of a reflector 50 which is provided above the motor assembly 18 at the junction of the opaque and transparent portions of housing 10. Advantageously, the reflector 50 may comprise a sheet of metal foil, or the like, which is transversely positioned across housing 10 and which is provided with a reflecting upper surface so that when the flag is rotated into indicating position the viewing thereof from any angle is greatly facilitated. It is contemplated that reflector 50 may be made slightly concave to further facilitate indication of the flag 40. It is further contemplated that a scale 80 may be provided within housing 10 for facilitating the indicator function of the invention. Thus, scale 80 may be marked with suitable indicia and the leading edge 44 of flag 40 cooperates with the indicia to provide a quantitative measurement of soil moisture in addition to the general indication given by the raised or lowered position of flag 40.

In order that the flag 40 may be freely raised and lowered by the motor assembly 18 past indicator 50, the indicator is formed with a slot 52 extending across a substantial portion thereof, said slot 52 having a length greater than the maximum radius of the indicating flag 40.

The motor assembly 18 and the indicating flag 40 are operated in response to the action of a sensing probe 12 which extends from the hollow housing 10. In accordance with the illustrative embodiment of the probe 12 shown in FIGURE 3 of the drawing, the probe comprises a tubular body portion 54 forming a first electrode and a tip portion 56 forming a second electrode. The first and second electrodes are separated at their junction by any suitable insulating material, such as rubber O ring 58. It has been found advantageous in the construction of probe 12 to place the insulating O ring 58 between electrodes 54 and 56 and further to place a layer of insulating material, such as an insulating tape, around the extension 60 of tip electrode 56. Electrode 56 is then positioned in electrode 54 by force fitting extension 60 into the bore of the tubular electrode 54 and the two electrodes are fully insulated from each other.

The motor 18 is provided with a pair of electric terminals, in the manner well known in the art, and a conductor 62 is connected between one of the motor terminals and the body electrode 54, while a second conductor 64 is connected between the other of the motor terminals and the tip electrode 56.

In accordance with the known principle of the galvanic couple, an electric current is generated at the junction of dissimilar materials when the junction is placed in a suitable electrolyte. This principle is utilized in the invention by forming the electrode 54 of a material different than electrode 56. Preferably, electrode 54 may be brass, carbon or the like and electrode 56 may be zinc, magnesium or other suitable metals.

Thus, when the invention is used in gardening, the probe 12 is inserted into the soil, and in the absence of suitable moisture content, there will be no electric current generated at the junction of the two electrodes. Under these conditions, electric motor 18 will not be energized and the flag 40 will be in the rest position to indicate the need for watering the soil. When the soil has been sufficiently watered so that the moisture content at the junction of electrodes 54 and 56 causes an electric current to be generated, in accordance with the above-described principle, the motor 18 is energized and raises the flag 40 to its indicating position. This serves as a signal that the soil is sufficiently moist and that the watering action may be stopped.

It has been found that the invention may be made sufficiently sensitive to provide an indication of moisture by having the flag 40 raised to its half range position, and that the invention may be further used to measure fertilizer content in the soil by moving the flag to its full range position when sufficient fertilization exists in the soil. This additional rotation of flag 40 is due to the great amount of current produced at the electrode junction level by the mineral content of the soil resulting from the presence of fertilizer therein. Accordingly, it can now be seen that the invention may be used to measure both moisture and fertilizer content as indicated upon the position of indicating flag 40.

It further is contemplated that the probe 12 may either be permanently attached to the hollow housing 10 as shown in FIGURES 2 and 3, or the probe 12 may be constructed so as to be selectively attached to or detached from the housing 10 as shown by the probes illustrated in FIGURES 4 and 5. In the fixed probe embodiment of FIGURES 2 and 3, the probe is provided with a knurled flange 66 at the upper end thereof and the flange 66 is embedded in the plastic housing i a firm and secure manner by applying heat to housing 10. If desired, the probe may be then cemented to insure additional strength at the junction of the probe and the housing. In accordance with the probe embodiments shown in FIGURES 4 and 5, the probe is provided with a flange 68 which is suitably screw threaded therearound. In accordance with this type of construction, the housing 10 also is threaded so that the probe may be screwed into position therein in a ready and easily adaptable manner. In this type of construction, the threaded flange 68 forms one conductor of the probe and the other conductor 64 which extends through the middle of the electrode may be connected in any suitable manner to the other conductor of the motor 18.

It also is contemplated that two or more probe sections may be selectively coupled to each other to form a composite probe of any desired length, and this composite probe is adapted to be attached to the housing 10. Preferably, the probe sections may be attached to each other as by coaxial coupling to insure a tight fit and a complete circuit for conductivity of the probe current to the motor within housing 10.

It may sometimes occur that the probe electrode may become polarized by the formation of hydrogen atoms along the probe surface when the probe is inserted in the soil for an extended period of time. The polarization of the electrode is undesirable in that the probe resistance is increased with a resultant reduction in the voltage generated by the probe. In accordance with an aspect of this invention, this possible difficulty is overcome by the probe embodiments shown in FIGURES 4 and 5 of the drawing. In the illustrative probe of FIGURE 4 the tubular body electrode 70 is provided with a plurality of openings extending through the tube, and the hollow inner portion of the tubular electrode is filled with a suitable oxidizing agent 72, such as manganese dioxide. It is a feature of this invention that the presence of oxidizing agent 72 within the electrode 70 causes oxygen to combine with the hydrogen atoms to form water and thereby depolarizing the probe. Thus, the probe can be left in the soil for longer periods of time without erroneous results due to polarizing action.

In the illustrative embodiment illustrated in FIGURE 5, the body electrode 74 may be formed of a suitable stainless steel screen having a fine mesh so that the oxidizing agent 72 within the probe may communicate with the hydrogen atoms on the outer surface of the probe. This also serves to depolarize the probe in the manner explained above.

In addition to forming the probe 12 with electrodes of dissimilar materials, those skilled in the art will readily appreciate that elements of similar material may be used as the electrodes. In this case, the invention will indicate soil resistance since the amount of current passed to the motor, when an electric battery is connected in series with the motor and the probe, will be dependent upon the resistance of the soil at the junction of the two electrodes.

It will further be appreciated by those skilled in the art that the current output of the probe may be used as a signal to control an automatic sprinkling device, if desired. Thus, the output of the probe may be used to energize suitable relay control apparatus for turning on or turning off the water sprinkling system. Accordingly, the invention may be used in a completely automatic system for controlling the sprinkling of lawns or the like.

Although the exemplary embodiments described above have been shown for the purpose of illustrating the principles of the invention, it will be readily understood that these principles may be applied with equally advantageous results in many other types of physical structures and uses thereof. Accordingly, modifications may be made in the construction and arrangement of the above-described indicating apparatus without departing from the real spirit of the invention, and that it is intended to cover by the appended claims, any modified forms or use of equivalents which may be included within their scope.

What is claimed as the invention is:

1. A moisture measuring and indicating device comprising a hollow housing shaped to receive manually applied pressure to enable said device to be inserted into moisture containing material, an electric motor positioned within said housing, said motor including a rotatable armature having a pair of terminals connected thereto, an indicating flag secured to said armature for rotation therewith, an elongated probe extending from said housing in alignment with the longitudinal central axis of said housing, said probe comprising an elongated metallic body portion forming a first electrode, a metallic end portion forming a second electrode, an insulating means positioned between said first and second electrodes at their junction, said first and second electrodes comprising almost all of the exposed surface area of said probe and said insulating means having an exposed surface area very much smaller than the exposed surface area of the first and second electrodes, said first and second electrodes being formed of dissimilar metals to provide a galvanic couple, conductor means connecting said first electrode to one of the armature terminals and conductor means connecting said second electrode to the other armature terminal whereby the generation of electric current by galvanic action in response to the presence of moisture at the junction of said electrode causes the armature to rotate said flag to an indicating position, the relatively large surface areas of said electrodes providing sufficient galvanic action current to eliminate the need for any separate power source for said armature.

2. An indicating device for measuring the moisture content of material comprising a hollow housing having a transparent portion and shaped to receive manually applied pressure to enable the device to be inserted into the moisture containing material, electrically energizable means positioned within said housing, said means including a movable armature, indicating means secured to said armature for movement therewith, said indicating means being visible through said transparent portion from the front and rear of said device, an elongated probe extending from said housing in alignment with the longitudinal, central axis of said housing, said probe comprising a body portion forming a first electrode, an end portion forming a second electrode, and insulating means positioned between said first and second electrodes at their junction, the exposed surface area of said insulating means being only a fraction of the exposed surface area of either of said electrodes, said first and second electrodes being formed of dissimilar materials to provide a galvanic couple, a conductor means connecting said first and second electrodes to said electrically energizable means such that the generation of electric current by galvanic action at the junction of said electrodes causes the armature to move said indicating means to an indicating position, said relatively large exposed surface area of said electrodes providing sufficient galvanic action current for said armature to eliminate the need for any separate power source.

3. An indicating device for measuring the moisture content of material comprising a hollow housing having a transparent viewing portion and shaped to receive manually applied pressure to enable the device to be inserted into moisture containing material, an electric motor including a movable armature positioned within said housing, an indicating flag secured to said armature for movement therewith, an elongated probe extending from said housing in alignment with the longitudinal central axis of said housing, said probe comprising a body portion forming a first electrode, an end portion forming a second electrode, said end portion electrode being tapered to facilitate the insertion of said probe into the moisture containing material, insulating means positioned between said first and second electrodes at their junction, the exposed surface area of said insulating means being only a fraction of the exposed surface area of either one of said electrodes, said first and second electrodes being formed of dissimilar metals to provide a galvanic couple, and conductor means connecting said first and second electrodes to said electric motor whereby the generation of electric current by galvanic action at the junction of said electrodes causes the armature to move said flag so as to permit viewing of a major portion thereof through the transparent viewing portion of said housing, the relatively large exposed surface area of said electrodes providing sufficient galvanic action current to eliminate the need for any separate power source for said electric motor.

4. An indicating device in accordance with claim 3, wherein said housing further comprises a reflecting means positioned in a plane substantially transverse to the plane of movement of said indicating flag for facilitating the viewing of said flag from either the front or rear of said housing when the flag is moved by the motor into the energized indicating position.

5. An indicating device in accordance with claim 4 wherein said reflecting means comprises a planar member having at least one reflecting surface and having a slot formed therein to permit the indicating flag to pass through the reflecting means when the flag is moved into the energized indicating position.

6. An indicating device for measuring the moisture content of a material comprising a hollow housing, said housing including two molded symmetrical plastic sections cemented together to form an enclosed unitized structure, each of said plastic sections having a transparent portion, said housing being shaped to receive manually applied pressure to enable the device to be pushed into the moisture containing material, an electric motor positioned within said housing, said motor including a movable armature having a pair of terminals connected thereto, an indicating flag secured to said armature for movement therewith, said flag being positioned within said housing so as to be visible through the transparent portion of each plastic section whereby the indicating flag may be viewed from the front and back of said housing, an elongated probe extending from said housing in alignment with a longitudinal axis thereof, said probe being selectively attachable to and detachable from said hollow housing and comprising a body electrode, a tip electrode, and insulating means positioned between said body and tip electrodes at their junction, said body and tip electrodes being formed of dissimilar metal to provide a galvanic couple, and conductor means connecting said body and tip electrodes to different ones of said armature terminals such that the generation of electric current by galvanic action at the junction of said electrodes causes the armature to move said flag to an indicating position.

7. An indicating device in accordance with claim 6 further comprising scale means having suitable indicia marked thereon positioned within said housing adjacent the path of movement of said flag, said scale and said flag cooperating to provide a quantitative indication of the electric current generated at the junction of said electrodes.

8. A moisture indicating device comprising a housing shaped to receive manually applied pressure to enable the device to be inserted into moisture containing material, an electric motor including a movable armature having a pair of terminals positioned within said housing, an indicating flag secured to said armature for movement therewith, and an elongated probe extending from said housing in alignment with a longitudinal axis of said housing, said probe comprising a first metallic portion forming a first electrode connected to one armature terminal, a second metallic portion forming a second electrode connected to the other armature terminal, an insulating means positioned between said first and second electrodes at their junction, said first and second electrodes being formed of dissimilar metals to provide a galvanic couple, at least one of said electrodes being formed with a substantially porous body and oxidizing material contained therein for depolarizing said electrode such that the generation of electric current by galvanic action in response to the presence of moisture at the junction of the electrodes causes the armature to move the flag to an indicating position.

9. A moisture indicating device in accordance with claim 8 wherein the electrode formed with a substantially porous body is filled with manganese dioxide.

References Cited in the file of this patent

UNITED STATES PATENTS

| 269,454 | Parkhurst | Dec. 19, 1882 |
| 1,910,021 | Legg | May 23, 1933 |
| 2,238,903 | Lieneweg | Apr. 22, 1941 |
| 2,328,853 | Sherrard | Sept. 7, 1943 |
| 2,437,134 | Smith | Mar. 2, 1948 |
| 2,822,724 | Uffner | Feb. 11, 1958 |
| 2,836,793 | Kelly | May 27, 1958 |

FOREIGN PATENTS

| 686,051 | Great Britain | Jan. 14, 1953 |